United States Patent [19]
Yeh

[11] Patent Number: 5,505,605
[45] Date of Patent: *Apr. 9, 1996

[54] MIDDLE SOLE SLOPING MACHINE WITH LENGTH/HEIGHT ADJUSTABLE ROLLS

[76] Inventor: Tien-fu Yeh, No. 53, Alley 87, Lane 538, Sec. 4, An Ho Rd., Tainan, Taiwan

[ * ] Notice: The term of this patent shall not extend beyond the expiration date of Pat. No. 5,364,257.

[21] Appl. No.: 292,493

[22] Filed: Aug. 18, 1994

Related U.S. Application Data

[63] Continuation-in-part of Ser. No. 133,620, Oct. 7, 1993, Pat. No. 5,364,257.

[51] Int. Cl.⁶ .......................... B29C 53/00; B29C 43/46
[52] U.S. Cl. .......................... 425/150; 100/47; 100/168; 425/363; 425/367; 425/368
[58] Field of Search .......................... 425/135, 150, 425/363, 366, 367, 368, DIG. 127; 100/43, 47, 93 RP, 168, 171, 176

[56] References Cited

U.S. PATENT DOCUMENTS

| | | | |
|---|---|---|---|
| 1,114,572 | 10/1914 | Barcus | 425/368 |
| 3,670,644 | 6/1972 | Hoever et al. | 100/168 |
| 3,856,462 | 12/1974 | Mueller | 100/168 |
| 3,871,808 | 3/1975 | Ancker | 425/368 |
| 4,171,942 | 10/1979 | Missenard | 425/367 |
| 5,061,337 | 10/1991 | Fraser | 425/367 |
| 5,364,257 | 11/1994 | Yeh | 425/367 |

*Primary Examiner*—James P. Mackey
*Attorney, Agent, or Firm*—Omri M. Behr; Matthew J. McDonald

[57] ABSTRACT

A middle sole sloping machine includes a base plate, upper and lower rolls each including first and second roll sections, a fixed mount plate and a movable mount plate extending upward from the base plate, the movable mount plate being movable relative to the fixed mount plate in a direction parallel to the extending direction of the upper and lower rolls, a device for effecting relative movements between the fixed and movable mount plates along the extending direction of the upper and lower rolls, a second device for effecting vertical movements of the first and second roll sections of the upper and lower rolls, a third device for rotating the upper and lower rolls, a controller mounted to each of the first and second devices, and a control box electrically connected to the controllers to provide an automatic control for adjustments of the roll sections.

15 Claims, 11 Drawing Sheets

MIDDLE SOLE SLOPING MACHINE WITH LENGTH/HEIGHT ADJUSTABLE ROLLS

CROSS-REFERENCE TO RELATED APPLICATIONS

This is a continuation-in-part application of U.S. patent application Ser. No. 08/133,620 filed on Oct. 7, 1993, now U.S. Pat. No. 5,364,257.

BACKGROUND OF THE INVENTION

1. Field of the Invention

The present invention relates to a middle sole sloping machine with automatic control devices to control adjustments of lengths and heights of rolls thereof to manufacture middle soles of various dimensions.

2. Description of Related Art

Conventionally, manufacturers must produce dozens of correspondingly shaped roll pairs due to the diversification of the dimensions of the middle soles. Applicant's U.S. patent application Ser. No. 08/133,620 discloses a middle sole sloping machine including a pair of rolls the lengths and heights of which can be adjusted. The present invention provides an improved design to give an automatic control for such adjustments.

SUMMARY OF THE INVENTION

A middle sole sloping machine generally includes a base plate, upper and lower rolls each including first and second roll sections, a fixed mount plate and a movable mount plate extending upward from the base plate, the movable mount plate being movable relative to the fixed mount plate in a direction parallel to the extending direction of the upper and lower rolls, a first driving device for effecting relative movements between the fixed and movable mount plates along the extending direction of the upper and lower rolls thereby changing the length of the sloping section of the middle sole, and second, third, fourth, and fifth driving devices for effecting vertical movements of the first and second roll sections of the upper and lower rolls thereby changing the thicknesses of both ends of the middle sole.

By such an arrangement, both the lengths and heights of the sloping sections of the upper and lower rolls are adjustable to form middle soles of various dimensions.

The invention features that controllers, such as decoders, counters, and photodetectors are provided to the driving devices, and a control box is electrically connected to the controllers, thereby providing automatic control of the adjustment of the rolls.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
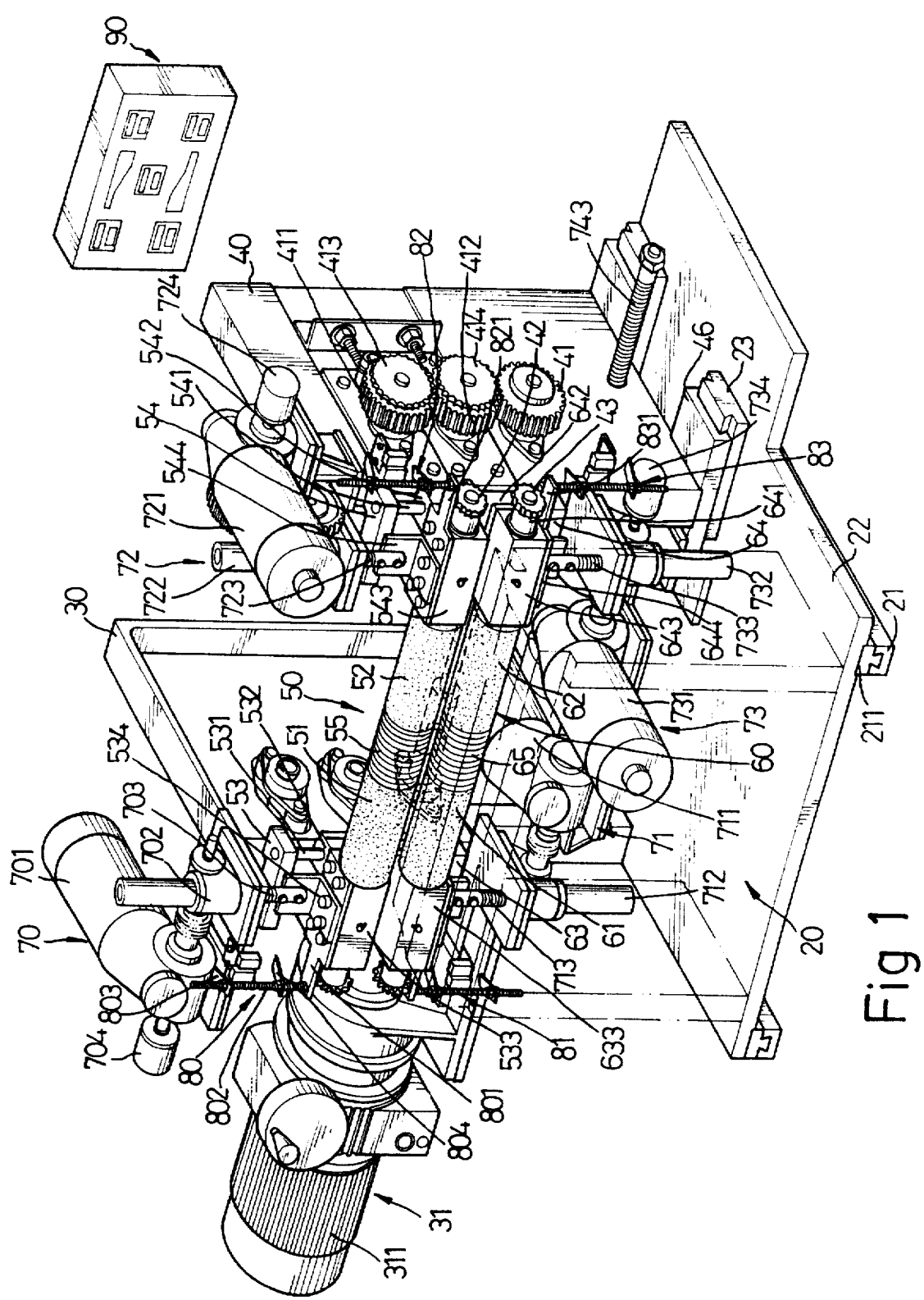
FIG. 1 is a perspective view of a middle sole sloping machine in accordance with the present invention, the frame portion and the cutter assembly being omitted for clarity.
Figure 2:
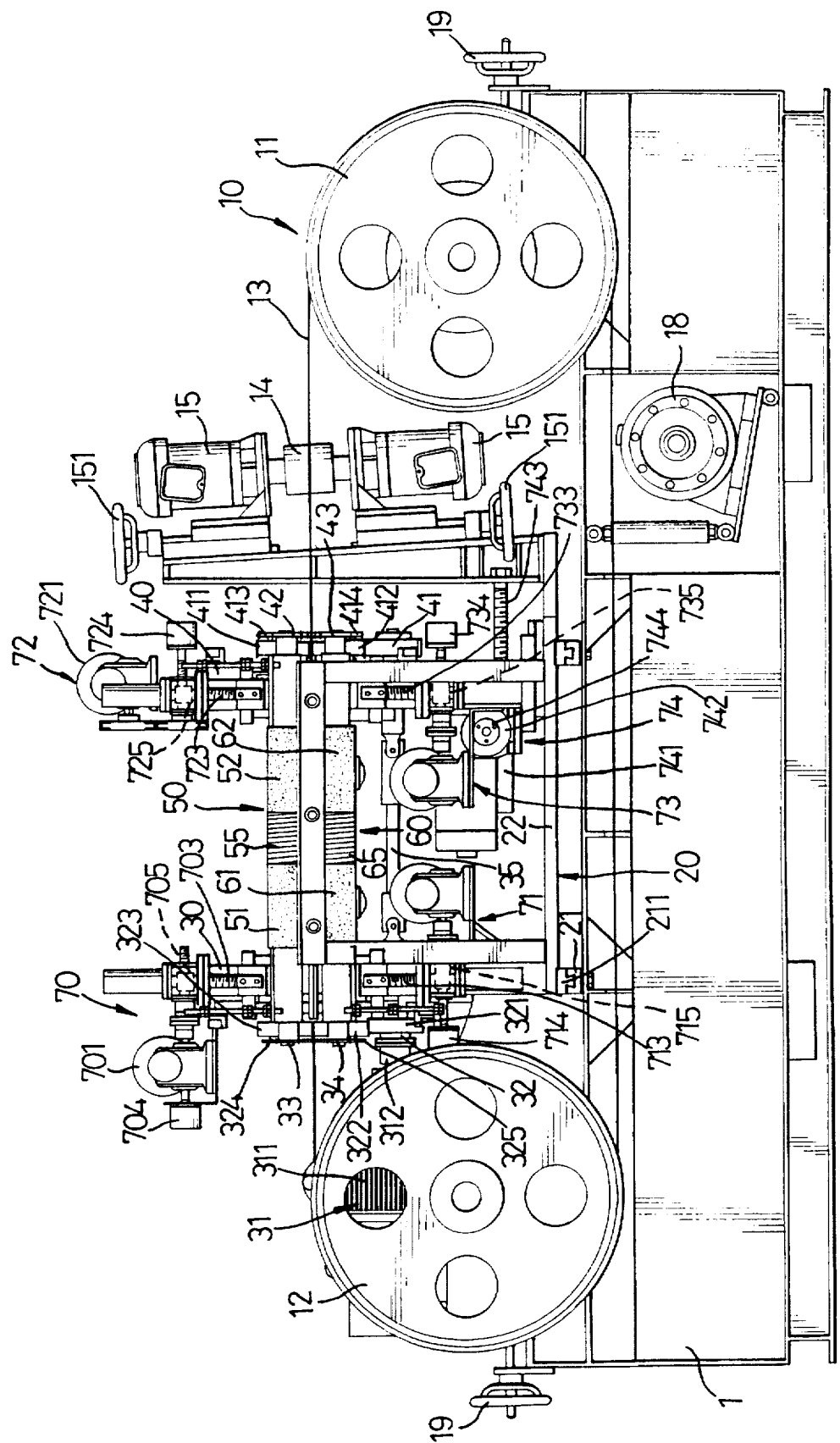
FIG. 2 is a front elevational view of the middle sole sloping machine in accordance with the present invention.

Referring now to FIGS. 1 and 2, a middle sole sloping machine includes a frame 1, a base assembly 20 movably mounted on the frame 1, and a cutter seat 10 located in front of the base assembly 20 (see the direction of FIG. 1, the middle sole material is fed from the rear side to the front side of the sloping machine). As shown in FIG. 2, an endless belt type cutter 13 is mounted around a pair of cutter wheels 11 and 12 which are respectively disposed on two sides of the cutter seat 10 and activatable by a driving means 18. An adjusting means 19 is provided to each cutter wheel 11, 12 to adjust the distance between the cutter wheels 11 and 12, thereby adjusting the tightness of the cutter 13. A pair of grinding stones 14 are provided to the cutter 13, each grinding stone 14 being driven by a motor 15 and being adjustable in vertical position by a wheel device 151. The cutter seat 10 and corresponding cutter arrangements are conventional and thus are not further described.

Figure 3:
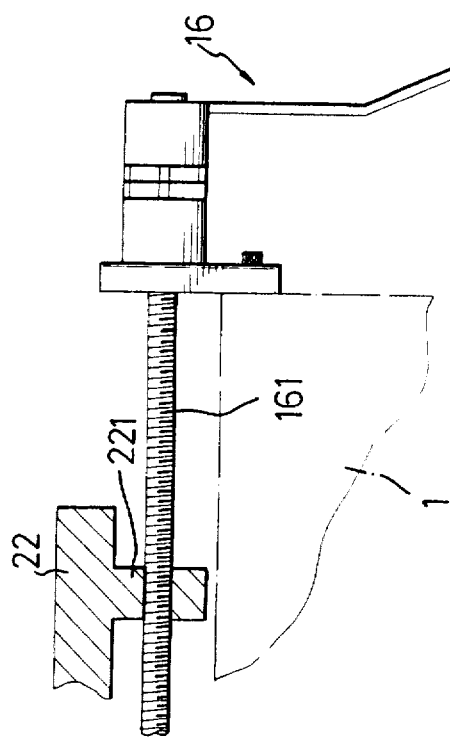
FIG. 3 is a partly-sectioned partial schematic view illustrating the rocker lever for operating the base plate of the middle sole sloping machine.

The movable base assembly 20 includes a base plate 22 which is movable relative to the fixed frame 1 by the provision of a first dovetail track means consisting of a pair of spaced first track members 211 on an underside of the base plate 22 and a pair of correspondingly shaped second track members 21 mounted on the frame 1. Referring to FIG. 3, a ratchet-type rocker lever 16 is secured to the frame.1 and is coupled to an extension 221 which extends downwardly from an underside of the base plate 22 and which includes a threaded hole (not labeled) to receive an adjusting bolt 161 rotationally drivable by the rocker lever 16. Under operation of a rocker handle 162 of the rocker lever 16, the adjusting bolt 161 rotates to urge the base plate 22 to slide along the second track members 21, thereby adjusting the distance between the cutter 13 and rolls 50 and 60 on the base assembly 20. It is appreciated that other types of actuating means can be used to effect the sliding movement of the base plate 22 relative to the frame 1 to effect the cutting of the middle sole material between the rolls 50 and 60.

Still referring to FIGS. 1 and 2, a fixed mount plate 30 and a movable mount plate 40 extend upward from an upper side of the base plate 22. The mount plate 40 is movable relative to the fixed mount plate 30 by the provision of a second dovetail track means including two spaced third track members 46 (see FIG. 1) securely attached to the bottom side of the mount plate 40 and two correspondingly shaped fourth track members 23 (see FIG. 1) secured on the base plate 22. As can be seen in FIG. 1, the dovetail track means extends in a longitudinal direction of the pair of vertically spaced rolls 50 and 60 which are rotatably mounted between the mount plates 30 and 40. A driving means 74 is provided to effect movement of the movable mount plate 40 and includes an adjusting bolt 743 which is mounted to a lower section of the movable mount plate 40 and which has one end attached to and thus is rotationally driven by a reduction motor 741 via a screw elevator 742, thereby controlling sliding movement of the movable mount plate 40 relative to the fixed plate 30, the purpose of which will be disclosed later.

Figure 4:
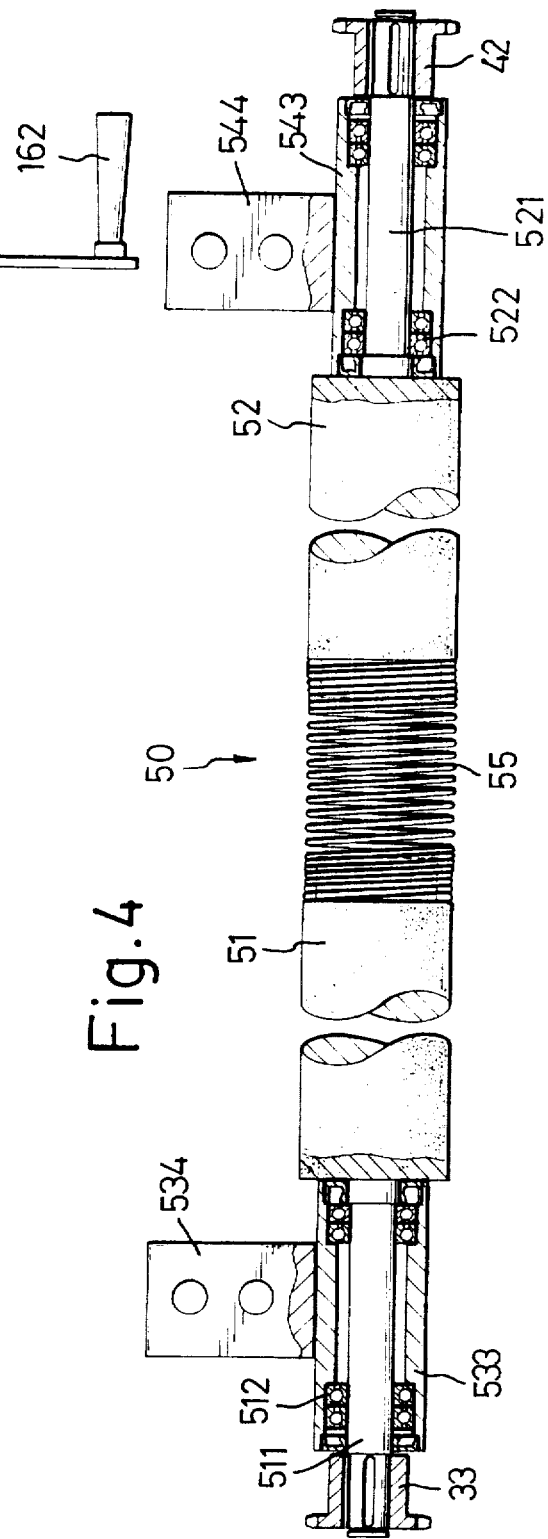
FIG. 4 is a front elevational view, partly sectioned, of the upper roll of the middle sole sloping machine.

Referring to FIG. 4, the upper roll 50 includes a first axle section 511 which is rotatably mounted in a first carrying member 533 by a bearing means 512, a second axle section 521 which is rotatably mounted in a second carrying member 543 by a bearing means 522, a first roll section 51 secured to a first end of the first axle section 511 to rotate therewith, a second roll section 52 secured to a first end of the second axle section 521 to rotate therewith, and a flexible member, such as a spring 55, mounted between the roll sections 51 and 52. Sprockets 33 and 42 are respectively mounted on second ends of first and second axle sections 511 and 521 to rotate therewith. The lower roll 60 has a structure identical to that of the upper roll 50 except that the reference numerals representing the associated parts are led by reference numeral "6" instead of "5".

Figure 5:
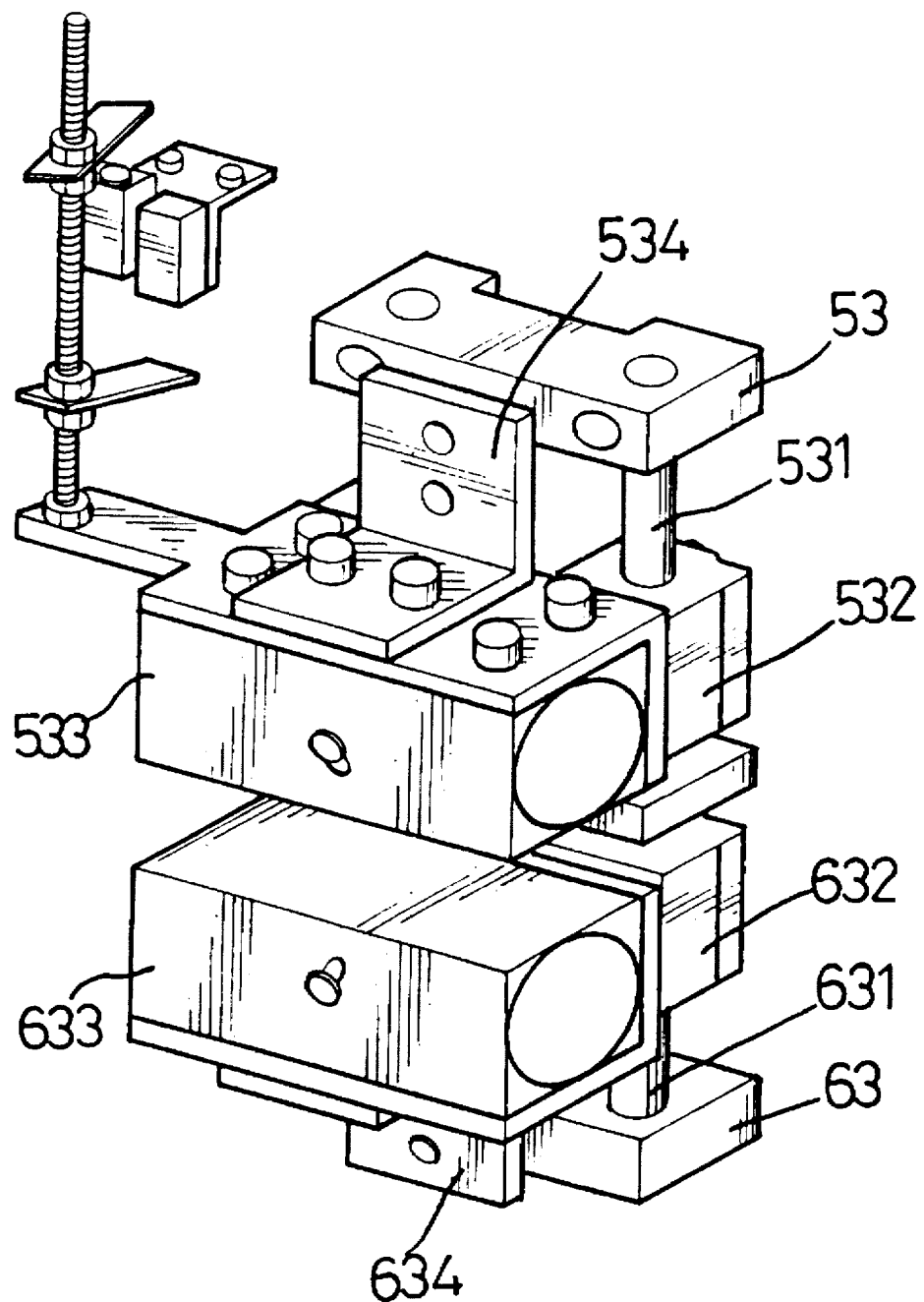
FIG. 5 is a perspective view illustrating guiding devices for the rolls of the sloping machine.

Referring to FIGS. 1 and 5, a first positioning member 53 is securely mounted to the fixed mount plate 30 and a guiding rod 531 extends vertically therefrom. A first guiding member 532 is securely attached to the first carrying member 533 and is slidable along the guiding rod 531, thereby providing a stable vertical movement for the carrying member 533. Similarly, a second positioning member 63 is securely mounted to the fixed mount plate 30 and a guiding rod 631 extends vertically therefrom. A first guiding member 632 is securely attached to the second carrying member 633 and is slidable along the guiding rod 631, thereby providing a stable vertical movement for the carrying member 533. Identical arrangements are provided to the second roll sections 52 and 62 except that the reference numerals representing the associated parts are respectively led by reference number "54" and "64".

Referring to FIGS. 1, 2, and 5, a bracket 534 is securely mounted to the first carrying member 533 for mounting a vertical screw rod 703 of a first elevator means 70 which is provided to carry the first carrying member 533 as well as the first roll section 51 in the vertical direction. The first elevator means 70 includes a reduction motor 701 and a screw elevator 702 which includes a vertical screw rod 703 secured to the first carrying member 533 to move therewith and a horizontal screw rod 705 which is coupled to and thus driven by the reduction motor 701 via a coupling (not labeled) and which meshes with the vertical screw rod 703. By such an arrangement, when the reduction motor 701 operates, the vertical screw rod 703 moves vertically and thus carries the first carrying member 533 together with the first roll section 51 to move vertically.

Each of a second third, and fourth elevator means 71, 72, and 73 for respectively adjusting the vertical positions of the first roll section 61 of the lower roll 60, the second roll section 52 of the upper roll 50, and the second roll section 62 of the lower roll 62 has a structure identical to that of the first elevator means 70 except that the reference numerals representing the associated parts are respectively led by reference numerals "71", "72", and "73" instead of "70".

Figure 6:
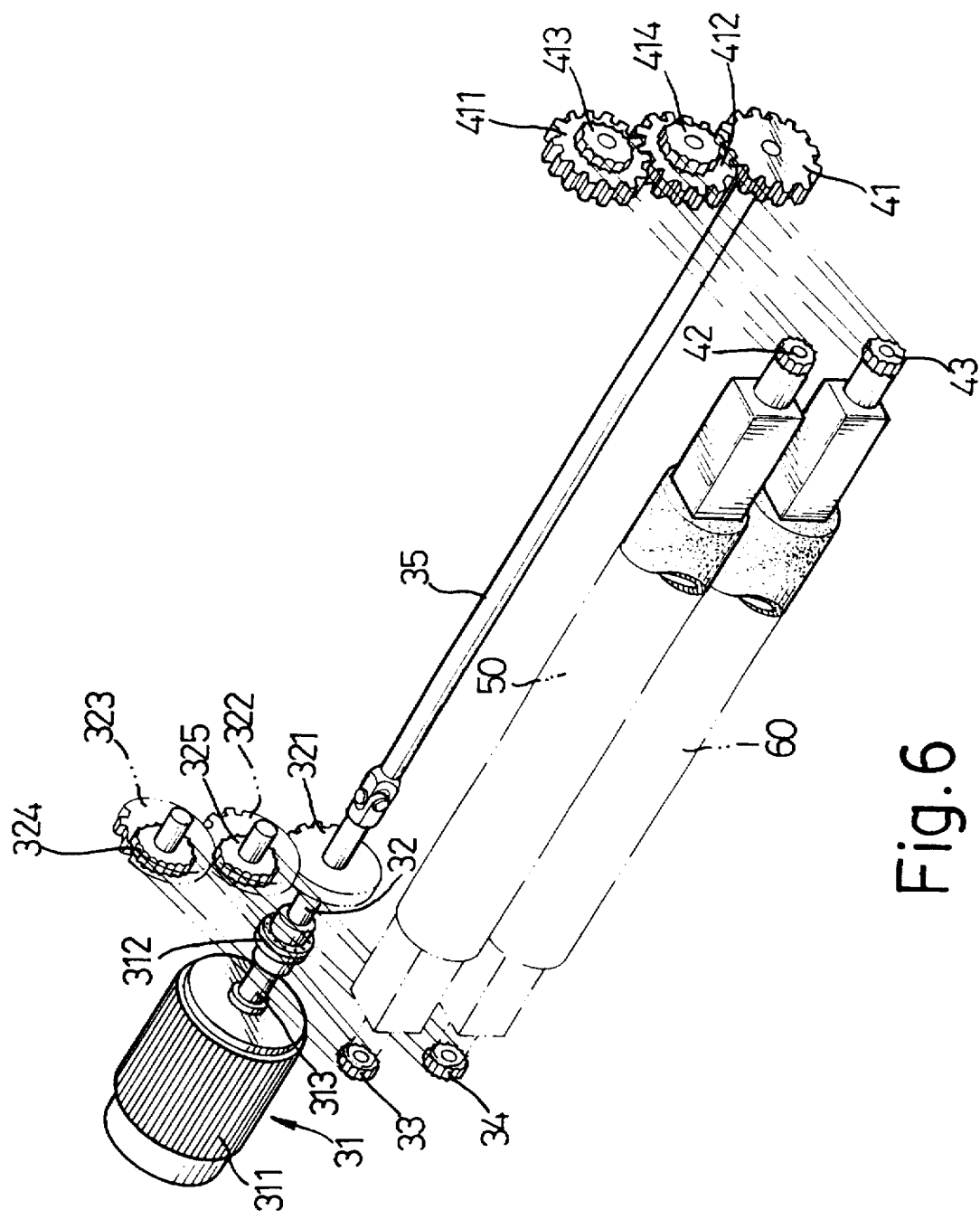
FIG. 6 is a perspective view illustrating the transmission assembly for the rolls of the sloping machine.

Still referring to FIGS. 1 and 2 and further to FIG. 6, the driving assembly and transmission assembly for rotating the rolls 50 and 60 to effect the forming of the middle sole include a driving means 31 including a motor 311 with a stepless speed change device whose output shaft 313 drives a coupling 312 which, in turn, couples a first axle section 32 which couples a second axle section 35 via a universal joint 314. A gear 321 is securely mounted on the first axle section 32 to rotate therewith, and another gear 41 is securely mounted to a distal end of the second axle section 35 to rotate therewith. Alternatively, the first and second axle sections 32 and 35 together with the universal joint 314 can be replaced by a single transmission shaft.

Gear 322 and sprocket 325 are rotatably mounted on the fixed mount plate 30 by a common shaft (not labeled) in which gear 322 meshes with gear 321 and sprocket 325 is connected with a sprocket 34 securely mounted on the first axle section 611 of the lower roll 60 via a chain (not labeled). Gear 412 and sprocket 414 are rotatably mounted to the movable mount plate 40 by a common shaft (not labeled) in which gear 412 meshes with gear 41 and sprocket 414 is connected with another sprocket 43 securely mounted on the second axle section 621 of the lower roll 60 via a chain (not labeled).

Gear 322 meshes with a gear 323 which together with a sprocket 324 are rotatably mounted to the fixed mount plate 30 by a common shaft (not labeled). Sprocket 324 is connected with sprocket 33 on the first axle section 511 of the upper roll 50 via a chain (not labeled). Gear 412 meshes with another gear 411 which together with a sprocket 413 are rotatably mounted to the movable mount plate 40 by a common shaft (not labeled). Sprocket 413 is connected with sprocket 42 on the second axle section 521 of the upper roll 50. By such an arrangement, when the motor 311 operates, the rolls 50 and 60 rotate upon transmission of the transmission assembly, thereby effecting the forming of the middle sole.

Figure 7:
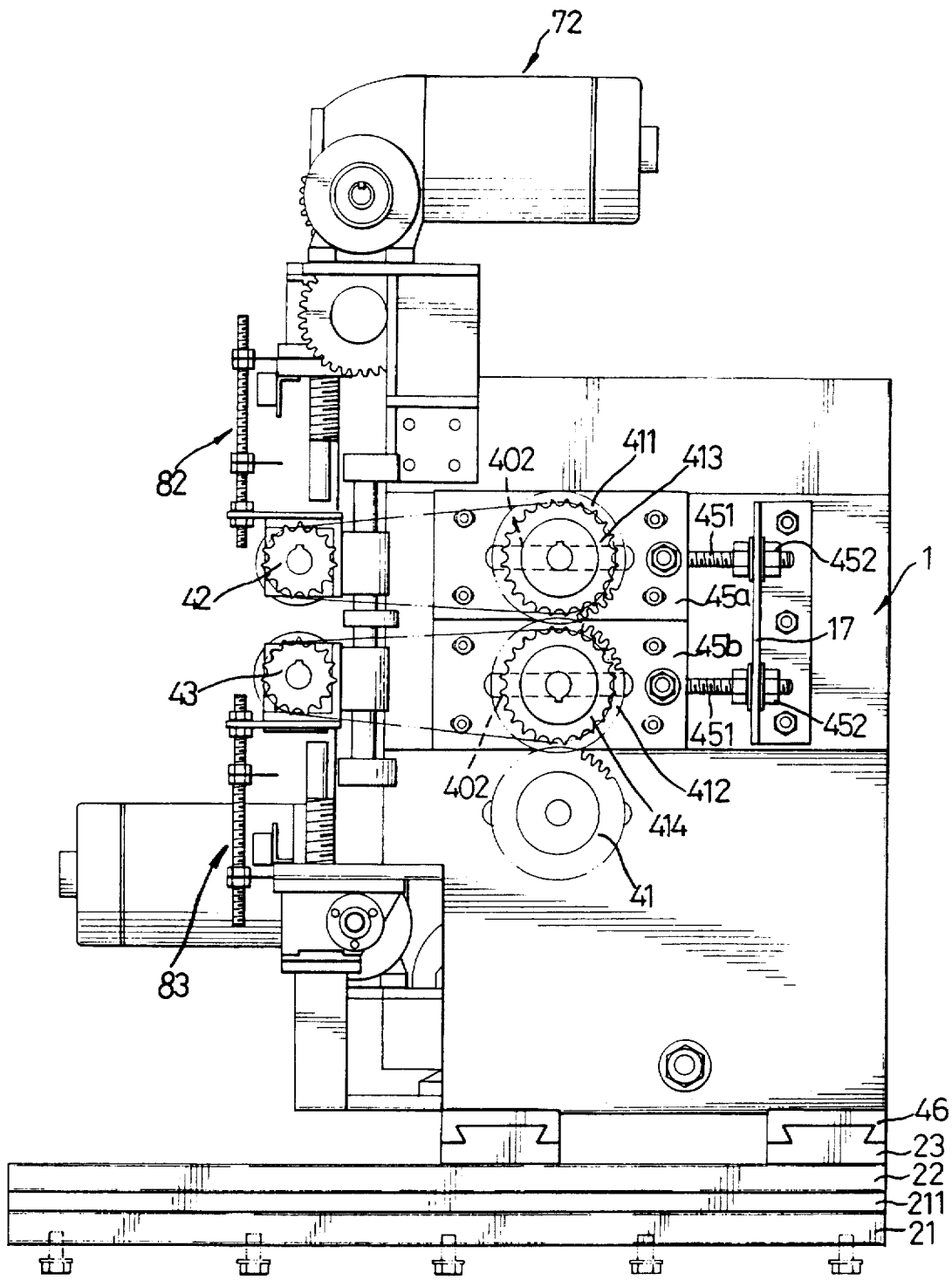
FIG. 7 is a right side elevational view of the middle sole sloping machine in FIG. 1.

Referring to FIGS. 1, 6, and 7, gear 411 together with sprocket 413 are mounted on an upper seat 45a which is slidably mounted to the movable mount plate 40 which, in turn, has an elongate hole 402 extending along the longitudinal direction thereof, such that the common axle of gear 411 and sprocket 413 may move along the elongate hole 402 upon movement of the slidable upper seat 45a relative to the movable mount plate 40 under operation of an associated adjusting screw 451 a first end of which is securely attached to the upper seat 45a to move therewith and a second end of which is mounted, by two nuts 452, to a positioning plate 17, which, in turn, is securely mounted to the frame 1.

Similarly, gear 412 together with sprocket 414 are mounted on a lower seat 45a which is slidably mounted to the t movable mount plate 40 which, in turn, has a second elongate hole 402 extending along the longitudinal direction thereof, such that the common axle of gear 412 and sprocket 414 may move along the second elongate hole 402 upon movement of the slidable lower seat 45b relative to the movable mount plate 40 under operation of an associated adjusting screw 451 a first end of which is securely attached to the lower seat 45b to move therewith and a second end of which is mounted, by two nuts 452, to the positioning plate 17.

The user may simultaneously turn the two nuts 452 on the associated adjusting screw 451 in the same direction, which causes horizontal movement of the adjusting screw 451 and the associated upper seat 45a or lower seat 45b to achieve the adjustment of the tightness of the chains.

This arrangement allows the user to adjust the distance between the sprockets 43 and 414; 42 and 413, thereby adjusting the tightness of the chains mounted therearound after having adjusted horizontal and/or vertical positions of the second roll sections 52 and 62. A same arrangement is provided to the fixed mount plate 30 to allow adjustments of the tightness of the chains mounted around sprockets 33 and 324; 34 and 325 after having adjusted horizontal and/or vertical positions of the first roll sections 51 and 61.

Referring to FIGS. 1 and 2, a controller, such as a decoder 704, 714, 724, 734 is mounted to the associated reduction motor 701, 702, 703, 704. The decoder may be substituted by a counter or photodetector.

Figure 8:
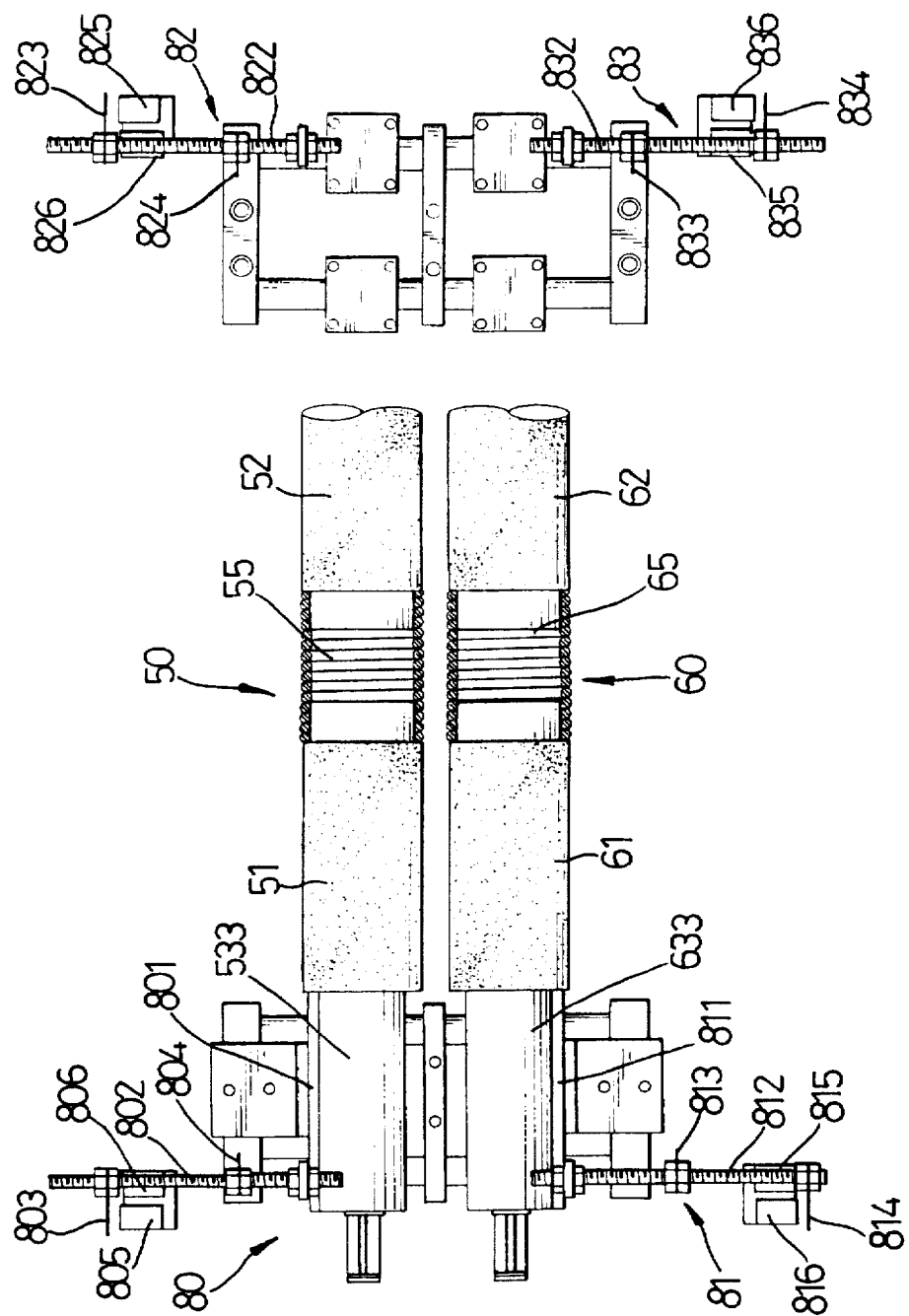
FIG. 8 is a side view illustrating control devices for vertical adjustment of the roll sections in which the second roll sections are omitted for clarity.
Figure 9:
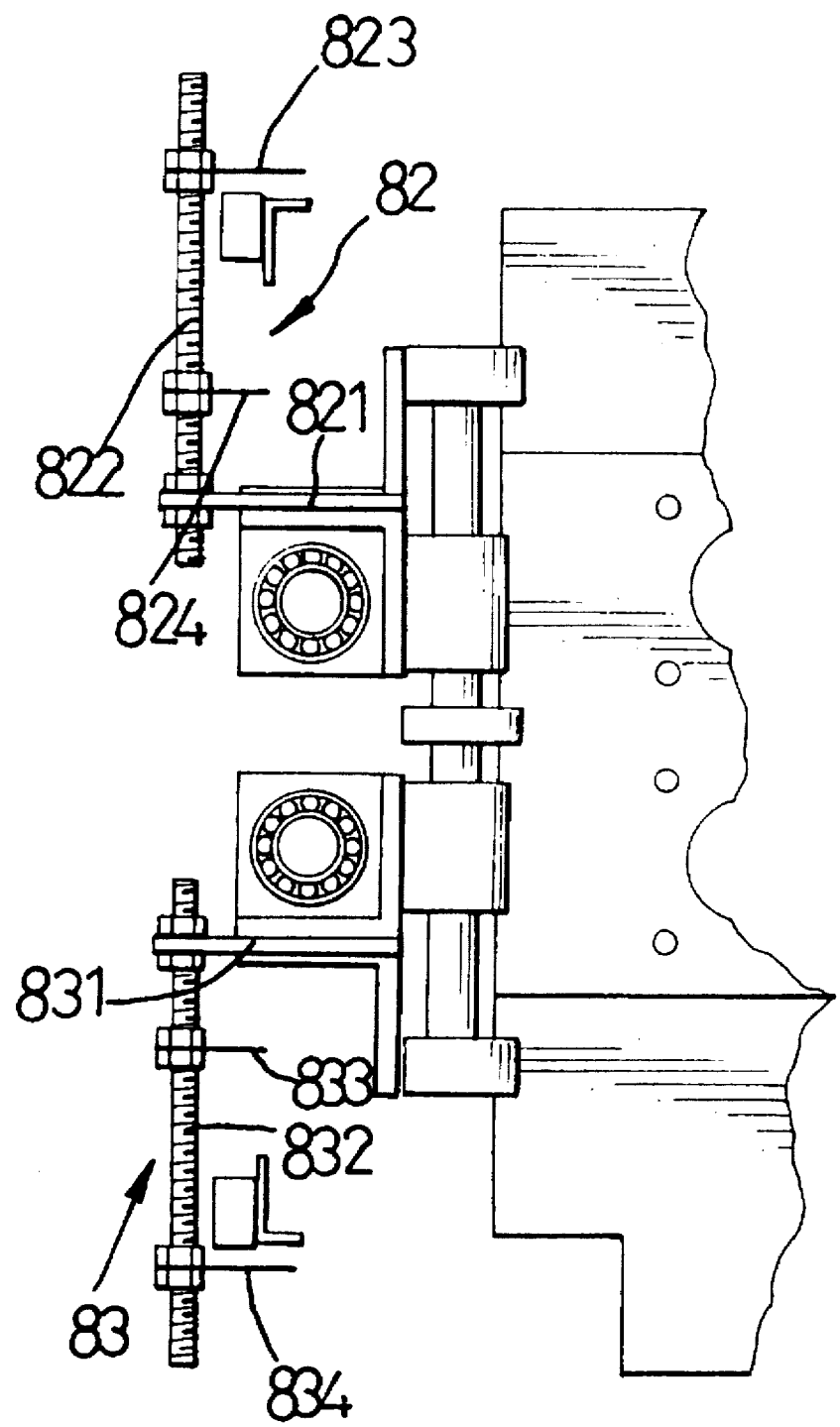
FIG. 9 is a partial side view illustrating the control devices in FIG. 8.

Referring to FIGS. 1, 8, and 9, the sloping machine further includes four control devices 80, 81, 82, and 83. Control device 80 includes an extension plate 801 extending from the first carrying member 533, a vertical screw 802 securely mounted to the extension plate 801, upper and lower activating plates 803 and 804 respectively adjustably mounted to upper and lower ends of screw 802 and each of which is positioned by two nuts (not labeled), and two sensors 805 and 806 mounted to the frame at proper locations in which sensor 805 cooperates with activating plate 803 and sensor 806 cooperates with activating plate 804. The sensors may be proximity switches, electric eyes, or microswitches.

Each of control devices 81, 82, and 83 has a structure identical to that of control device 80 except that the reference numerals representing the associated parts are respectively led by reference numerals "81", "82" and "83" instead of "80" and that the extension plates 811, 821, and 831 thereof respectively extend from associated carrying members 633, 543, and 643.

Figure 10:
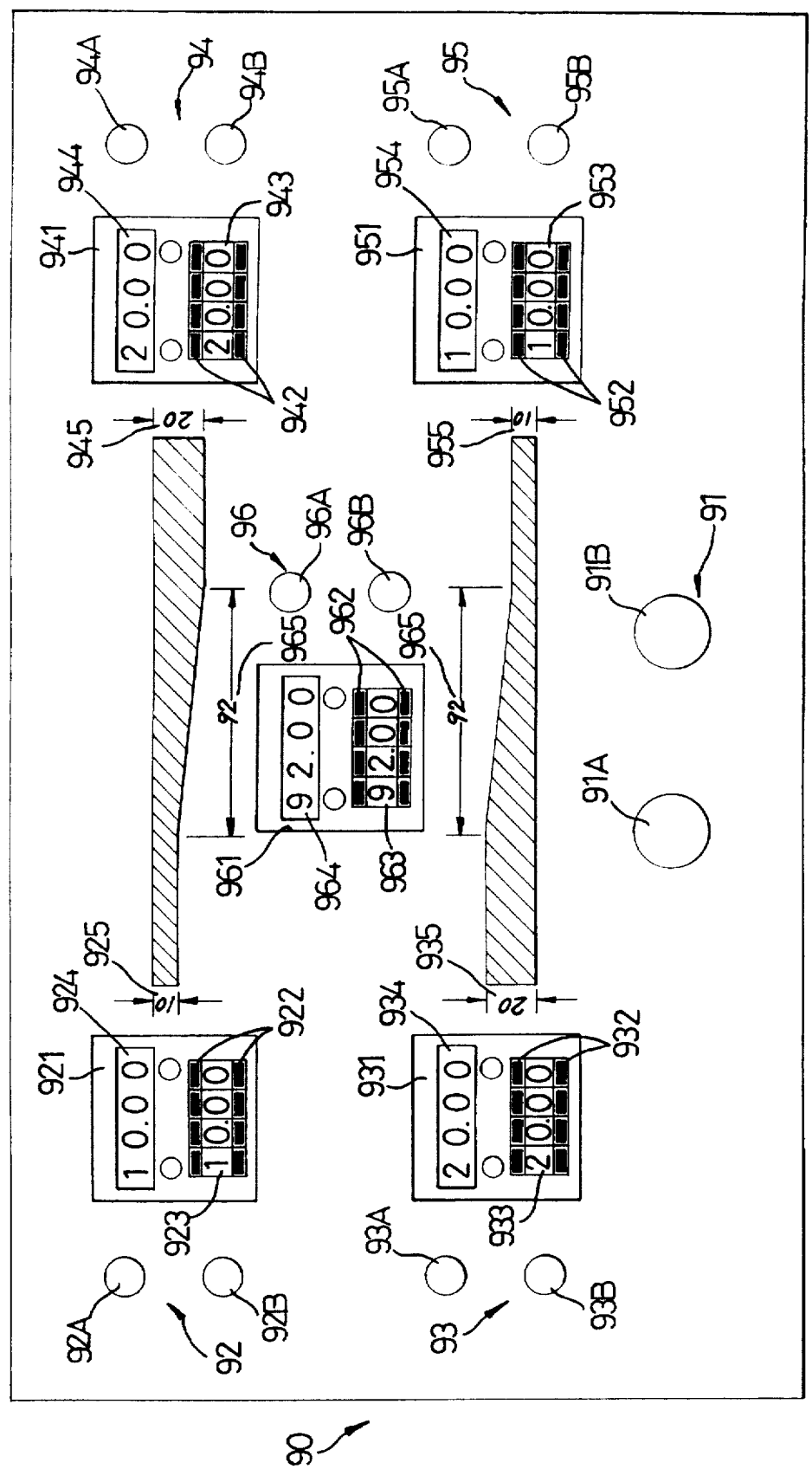
FIG. 10 is a front elevational view of a control box.
Figure 11:
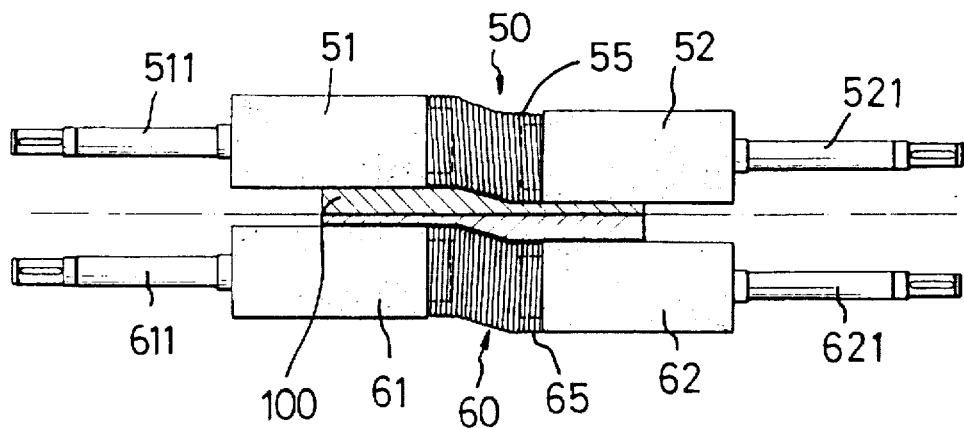
FIG. 11 is a side view illustrating a pair of rolls for forming the middle sole.

Referring now to FIG. 10, the sloping machine further includes a control box 90 mounted to a side of the frame 1 and includes main control buttons 91 and other control buttons 92, 93, 94, 95, and 96. Main control buttons 91 includes a start button 91A and a stop button 91B. Buttons 92 includes a start button 92A and 92B to control the travel of the first roll section 51, buttons 93 includes a start button 93A and a stop button 93B to control the travel of the first roll section 61, buttons 94 includes a start button 94A and a stop button 94B to control the travel of the second roll section 52, buttons 95 includes a start button 95A and a stop button 95B to control the travel of the second roll section 62, and buttons 96 includes a start button 96A and a stop button 96B to control the travel of the movable mount plate 40. Each pair of buttons 92, 93, 94, 95, 96 have a corresponding display means 921, 931, 941, 951, 961 provided adjacent thereto. The decoders 704, 714, 724, 734, and 744 and the control devices 80, 81, 82, and 83 are all connected to the control box 90 by wires.

Operation

Figure 12:
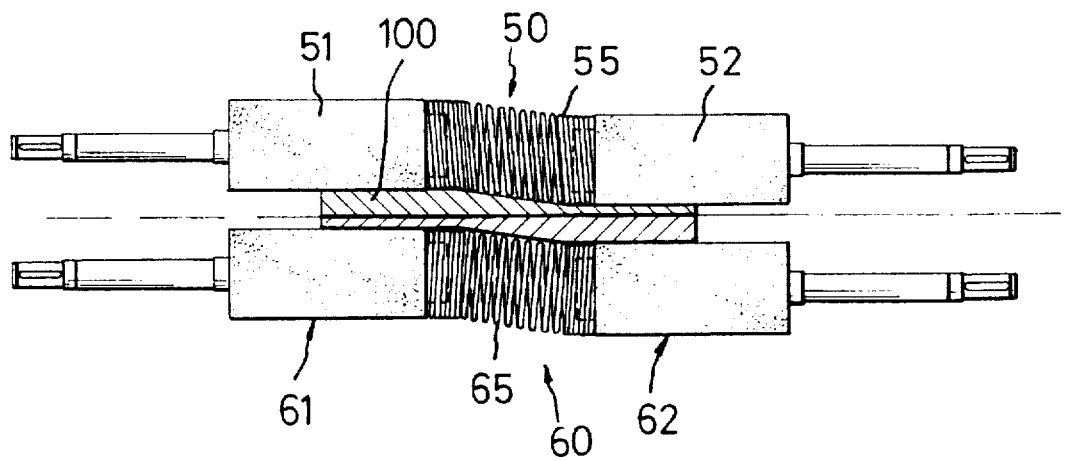
FIGS. 12 through 14 are schematic views illustrating adjustment of the rolls in response to the change of the dimension of the middle sole.
Figure 13:
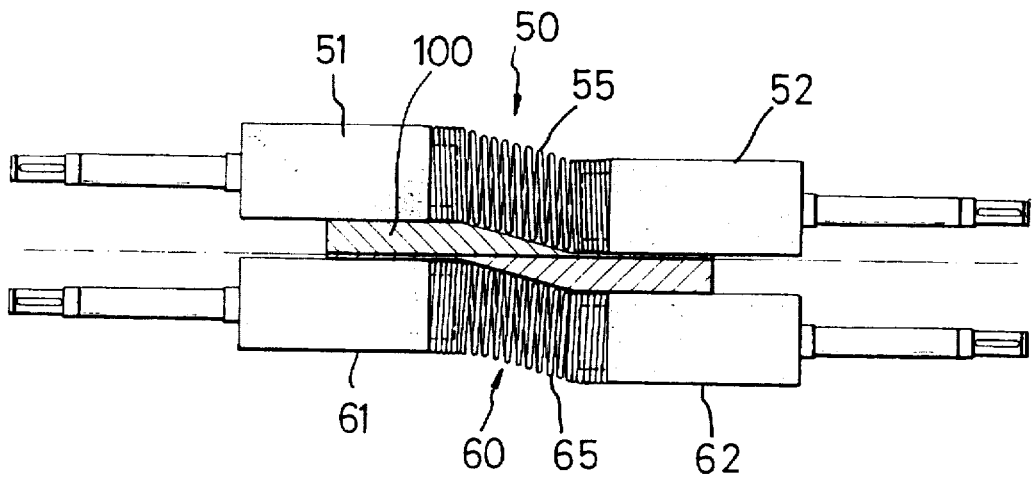
Figure 14:
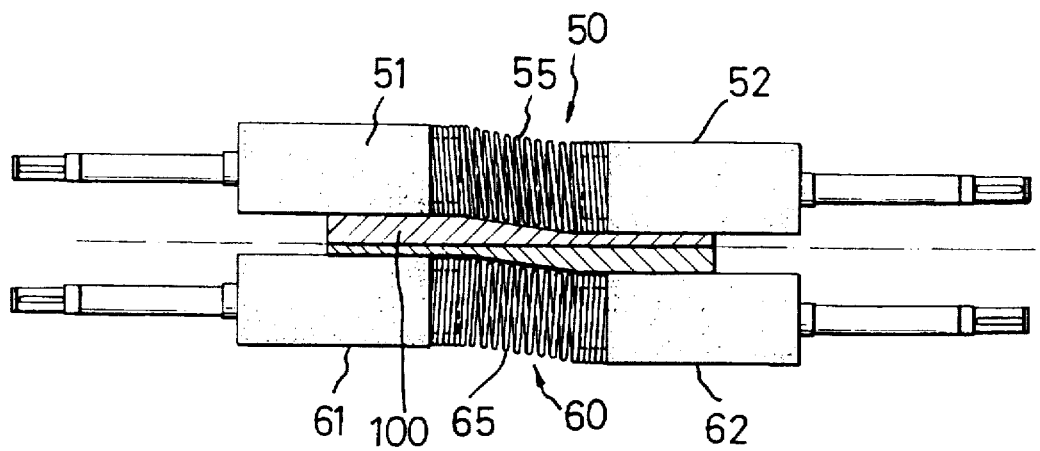

Referring now to FIGS. 1 and 6, when the motor 311 operates, the rolls 50 and 60 rotate to form the middle sole 100, and the cutter 13 cuts the middle sole 100 from its central line after the formation. When a batch of middle soles of a specific dimension is finished, the length of the sloping section and/or thicknesses of the middle sole 100 is changed to manufacture middle soles of a different size. FIG. 12 shows the change of the length of the sloping section of the middle sole 100 (not shown) by the sliding movements of the movable mount plate 40 relative to the fixed plate 30 under operation of motor 741. FIG. 13 shows the change of the thicknesses of both ends of the middle sole 100 by the vertical movements of the first and second roll sections 51, 52, 61, and 62 of the upper and lower rolls 50 and 60 under operation of the elevator means 70, 71, 72, and 73. FIG. 14 shows the change both in length and thicknesses of the middle sole 100 upon operation of motor 741 and elevator means 70, 71, 72, and 73. The springs 55 and 65 allow such adjustments, yet it is appreciated that the springs 55 and 65 may be omitted without departing the scope of the invention. Subsequent adjustment of the tightness of the chains are required upon operation of the adjusting screws 451 which has been clearly described hereinbefore.

Referring to FIG. X, for automatic control, when thicknesses 925, 935, 945, 955, and length 965 of the middle sole 100 are both changed, the user may press adjusting buttons 922, 932, 942, 952, 962 provided to upper and lower sides of an associated indicator 923, 933, 943, 953, 963 until the value displayed on the indicator displays the exact dimensions. Then, the start button 91A is pressed (the user may press other start buttons 92A, 93A, 94A, 95A, and 96A to achieve the same purpose). The decoders 704, 714, 724, 734, and 744 receive the signals of the set dimensions and urge the associated motors 701, 711, 721, 731, and 741 to operate, thereby causing movement of the roll sections 51, 52, 53, and 54 and the movable mount plate 40 until the displays 924, 934, 944, 954, and 964 show the same dimension values of those displayed on the indicators 923, 933, 943, 953, and 963. When the user finds an error has occurred in the setting of the dimensions of the middle sole, he/she may press the associated stop buttons or the main stop button 91B to reset the machine. The control devices 80, 81, 82, 83, and 84 prevent excessive movements and allow zero adjustment.

When only the length or thickness of the middle sole is changed, e.g., the thicknesses 925, 955 are changed, after the adjusting buttons 922 and 952 are pressed, indicators 923 and 953 display exact dimensions of the thicknesses of the middle sole. Then, start buttons 92A and 93A or main start button 91A are pressed. The signals are transmitted to the decoders 704 and 734 which urge the motors 701 and 731 to operate, thereby causing movements of the roll sections 51 and 62 until the displays 924 and 954 show the same dimension values of those displayed on the indicators 923 and 953. Again, when the user finds error in the setting of the dimensions of the middle sole, he/she may press the associated stop buttons 92B and 95B or the main stop button 91B to reset the machine.

Accordingly, the present invention provides an improved design in the roll pair, thereby being able to manufacture middle soles of various dimensions under simple operations.

Although the invention has been explained in relation to its preferred embodiment, it is to be understood that many other possible modifications and variations can be made without departing from the spirit and scope of the invention as hereinafter claimed.

I claim:

1. A middle sole sloping machine comprising:

a base plate (22);

upper and lower rolls (50 and 60) each comprising first and second roll sections (51 and 52, 61 and 62);

a fixed mount plate (30) and a movable mount plate (40) extending upward from the base plate (22), the movable mount plate being movable relative to the fixed mount plate in a direction parallel to the extending direction of the upper and lower rolls, the first roll sections (51, 61) being movably attached to the fixed mount plate, the second roll sections (52, 62) being movably attached to the movable mount plate;

a first means (74) for effecting relative movements between the fixed and movable mount plates along the extending direction of the upper and lower rolls, thereby changing a distance between the first and second roll sections;

a second means (70, 71, 72, 73) for effecting vertical movements of the first and second roll sections of the upper and lower rolls relative to the fixed and movable mount plate;

a third means for rotating the upper and lower rolls;

a controller (704, 714, 724, 734, 744) mounted to each of the first means and the second means (70, 71, 72, 73, 74) and a control box (90) electrically connected to the controllers and having a plurality of control buttons, whereby dimensions of a middle sole are settable by the control buttons to control the positions of the first and second roll sections (51, 52, 61, 62) and the movable mount plate (40).

2. The middle sole sloping machine as claimed in claim 1 wherein the controllers (704, 714, 724, 734, 744) are decoders.

3. The middle sole sloping machine as claimed in claim 1 wherein the controllers (704, 714, 724, 734, 744) are counters.

4. The middle sole sloping machine as claimed in claim 1 wherein the controllers (704, 714, 724, 734, 744) are photodetectors.

5. The middle sole sloping machine as claimed in claim 1 further comprising:

a control device (80, 81, 82, 83) mounted adjacent to each of the first and second roll sections of the upper and lower rolls, each of the control devices (80, 81, 82, 83) includes an extension plate (801) extending from the associated carrying member (533, 543, 633, 643), a vertical screw (802, 812, 822, 832) securely mounted to the extension plate, upper and lower activating plates (803, 804; 813, 814; 823, 824; 833, 834) respectively adjustably mounted to upper and lower ends of the associated screw (802, 812, 822, 832), and first and second sensors (805, 806; 815, 816; 825, 826; 835, 836) mounted to the frame (1) in which the first sensor (805, 815, 825, 835) cooperates with the associated upper activating plate and the second sensor (806, 816, 826, 836) cooperates with the lower activating plate.

6. The middle sole sloping machine as claimed in claim 5 wherein the sensors are proximity switches.

7. The middle sole sloping machine as claimed in claim 5 wherein the sensors are electric eyes.

8. The middle sole sloping machine as claimed in claim 5 wherein the sensors are microswitches.

9. The middle sole sloping machine as claimed in claim 1 further comprising a flexible sloping section (55, 65) for interconnecting the first and second roll sections 52, 61 and 62) of the upper and lower rolls (50 and 60).

10. The middle sole sloping machine as claimed in claim 9 wherein the flexible sloping section (55, 65) is a spring.

11. The middle sole sloping machine as claimed in claim 1 wherein each of the upper and lower rolls includes first and second axle sections (511 and 521, 611 and 621) to which the first and second roll sections (51 and 52, 61 and 62) are respectively securely attached to rotate therewith, each of the first and second axle sections of the upper and lower rolls being rotatably mounted in a carrying member (533, 543, 633, 643), and the means for effecting vertical movements of the first and second roll sections of the upper and lower rolls including a bracket (534, 544, 634, 644) and an elevator means (70, 71, 72, 73) which includes a vertical screw rod (703, 713, 723, 733) which is secured to the associated carrying member (533, 543, 633, 643) to move therewith, a horizontal screw rod (705, 715, 725, 735) engaging with and thus driving the vertical screw rod, and a driving means (701, 711, 721, 731) for driving the horizontal screw rod, whereby rotation of the horizontal screw rods cause vertical movement of the first and second roll sections.

12. The middle sole sloping machine as claimed in claim 11 further comprising a positioning member (53, 54, 63, 64) securely mounted to the associated fixed and movable mount plates (30 and 40), a guiding rod (531) extending vertically from the associated positioning member (53, 54, 63, 64), a guiding rod (531, 541, 631, 641) being securely mounted to the associated carrying member (533, 543, 633, 643) and being slidable along the associated guiding rod (531, 541, 631, 641) thereby providing a stable vertical movement for the associated carrying members and roll sections.

13. The middle sole sloping machine as claimed in claim 1 wherein the third means includes:

a second driving means (31), an axle (313, 314, 35) driven by the second driving means, first and second driving gears (321 and 41) respectively mounted on two ends of the axle to rotate therewith;

first and second gears (322 and 412) respectively rotatably mounted to the fixed and movable mount plates (30 and 40) and respectively meshing with the first and second driving gears (321 and 41);

first and second sprockets (325 and 414) respectively concentric with the first and second gears (322 and 412) to rotate therewith and respectively and rotatably mounted to the fixed and movable mount plates (30 and 40);

third and fourth sprockets (34 and 43) respectively mounted on the first and second axle sections (611 and 621) of the lower roll (60) to rotate therewith and respectively connected with the first and second sprockets (325 and 414) via a first chain;

third and fourth gears (323 and 411) respectively rotatably mounted to the fixed and movable mount plates (30 and 40) and respectively meshing with the first and second gears (322 and 412);

fifth and sixth sprockets (324 and 413) respectively concentric with the third and fourth gears (324 and 413) to rotate therewith and respectively and rotatably mounted to the fixed and movable mount plates (30 and 40);

seventh and eighth sprockets (33 and 42) respectively mounted on the first and second axle sections (511 and 521) of the upper roll (50) to rotate therewith and respectively connected with the fifth and sixth sprockets (324 and 413) via a second chain.

14. The middle sole sloping machine as claimed in claim 13 wherein each of the first and fifth sprockets (325 and 324) is mounted to a first slidable seat (45a, 45b) slidingly mounted to the fixed mount plate (30) allowing adjustment of a distance between the first and third sprockets (325 and 34) and a distance between the fifth and seventh sprockets (324 and 33), each of the second and sixth sprockets (414 and 413) is mounted to a second slidable seat (45a, 45b) slidably mounted to the movable mount plate (40) allowing adjusting of a distance between the second and fourth sprockets (414 and 43) and a distance between the fourth and eighth sprockets (413 and 42).

15. The middle sole sloping machine as claimed in claim 14 wherein each of the first and second slidable seats (45a, 45b) includes an adjusting screw (451) secured thereto to move therewith, each of the adjusting screws (451) extending in a direction parallel to the sliding direction of the first and second slidable seats, the machine has a frame with four positioning plates (17) through each of which the associated adjusting screw (451) passes, and a nut being mounted on each of the adjusting screw such that rotation of the nut causes sliding movement of the associated adjusting screw and associated slidable seat, thereby adjusting the tightness of the first and second chains.

* * * * *